United States Patent
Vaisman et al.

(10) Patent No.: US 9,676,484 B2
(45) Date of Patent: Jun. 13, 2017

(54) ADAPTIVE TRANS-CRITICAL CARBON DIOXIDE COOLING SYSTEMS

(71) Applicants: Rolls-Royce Corporation, Indianapolis, IN (US); Rolls-Royce North American Technologies, Inc., Indianapolis, IN (US)

(72) Inventors: Igor Vaisman, Carmel, IN (US); Patrick C. Sweeney, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 234 days.

(21) Appl. No.: 14/143,812

(22) Filed: Dec. 30, 2013

(65) Prior Publication Data

US 2014/0260341 A1 Sep. 18, 2014

Related U.S. Application Data

(63) Continuation-in-part of application No. 14/109,416, filed on Dec. 17, 2013.
(Continued)

(51) Int. Cl.
*F25B 7/00* (2006.01)
*B64D 13/08* (2006.01)
(Continued)

(52) U.S. Cl.
CPC ............ *B64D 13/08* (2013.01); *B64D 13/006* (2013.01); *F25B 1/10* (2013.01); *F25B 6/04* (2013.01);
(Continued)

(58) Field of Classification Search
CPC .................. B64D 13/08; B64D 13/006; B64D 2013/0614; B64D 2013/0674; F25B 6/04;
(Continued)

(56) References Cited

U.S. PATENT DOCUMENTS

| 2,963,879 A | 12/1960 | De Paravicini |
| 3,153,331 A | 10/1964 | Rogers |

(Continued)

FOREIGN PATENT DOCUMENTS

| EP | 1762491 A2 | 3/2007 |
| JP | 2008224118 A | 9/2008 |

OTHER PUBLICATIONS

International Search Report PCT/US2013/078155 mailed on Oct. 17, 2014.
(Continued)

*Primary Examiner* — Len Tran
*Assistant Examiner* — Ana Vazquez
(74) *Attorney, Agent, or Firm* — Fishman Stewart PLLC

(57) ABSTRACT

A cooling system includes a first heat exchanger, an evaporator coupled to a thermal load of an aircraft. first and second cooling circuits coupled to the heat exchanger, the first and second cooling circuits selectable via a set of cooling circuit valves that are arranged to direct a refrigerant through the first circuit, the second circuit, or both the first and second circuits based on air passing through the first heat exchanger at ambient conditions of the aircraft, and a receiver configured to accumulate reserve refrigerant to provide flexibility in system operation as the cooling system operates in sub-critical, trans-critical, and super-critical modes of operation.

20 Claims, 10 Drawing Sheets

Related U.S. Application Data

(60) Provisional application No. 61/785,900, filed on Mar. 14, 2013.

(51) Int. Cl.
*B64D 13/00* (2006.01)
*F25B 1/10* (2006.01)
*F25B 6/04* (2006.01)
*F25B 40/00* (2006.01)
*F25B 41/00* (2006.01)
*B64D 13/06* (2006.01)

(52) U.S. Cl.
CPC .............. *F25B 40/00* (2013.01); *F25B 41/00* (2013.01); *B64D 2013/0614* (2013.01); *B64D 2013/0644* (2013.01); *B64D 2013/0674* (2013.01); *F25B 2341/0011* (2013.01); *F25B 2341/0661* (2013.01); *F25B 2400/0401* (2013.01); *F25B 2400/14* (2013.01); *Y02T 50/56* (2013.01)

(58) Field of Classification Search
CPC .......... F25B 2400/14; F25B 2341/0661; F25B 2400/0401; F25B 1/10; F25B 2341/0011; F25B 41/00; F25B 40/00; Y02T 50/56; F64D 2013/0644

See application file for complete search history.

(56) References Cited

U.S. PATENT DOCUMENTS

| | | | |
|---|---|---|---|
| 4,205,532 A | | 6/1980 | Brenan |
| 5,802,860 A | * | 9/1998 | Barrows ................ F25B 41/04 62/126 |
| 6,644,062 B1 | | 11/2003 | Hays |
| 6,647,742 B1 | | 11/2003 | Neiter et al. |
| 6,694,763 B2 | | 2/2004 | Howard |
| 6,698,214 B2 | | 3/2004 | Chordia |
| 6,813,895 B2 | | 11/2004 | Eisenhower et al. |
| 6,898,941 B2 | | 5/2005 | Sienel |
| 7,000,413 B2 | | 2/2006 | Chen et al. |
| 7,159,409 B2 | | 1/2007 | Manole |
| 7,299,619 B2 | | 11/2007 | Briesch et al. |
| 7,424,807 B2 | | 9/2008 | Sienel |
| 7,621,137 B2 | | 11/2009 | Aflekt et al. |
| 7,721,569 B2 | | 5/2010 | Manole |
| 7,818,971 B2 | | 10/2010 | Yamaguchi et al. |
| 7,818,978 B2 | | 10/2010 | Ducoulombier et al. |
| 8,196,421 B2 | | 6/2012 | Bush et al. |
| 8,327,651 B2 | | 12/2012 | Finney et al. |
| 8,418,482 B2 | | 4/2013 | Bush et al. |
| 8,424,326 B2 | | 4/2013 | Mitra et al. |
| 2003/0005718 A1 | | 1/2003 | Mitani et al. |
| 2005/0103487 A1 | | 5/2005 | Aflekt et al. |
| 2006/0042284 A1 | * | 3/2006 | Heberle ............ B60H 1/00428 62/236 |
| 2006/0162371 A1 | | 7/2006 | Lui et al. |
| 2007/0068178 A1 | | 3/2007 | Honma et al. |
| 2007/0157659 A1 | | 7/2007 | McPhail |
| 2007/0193301 A1 | * | 8/2007 | Andres ................. B64D 13/06 62/498 |
| 2008/0127672 A1 | * | 6/2008 | Ducoulombier .......... F25B 1/10 62/510 |
| 2008/0302118 A1 | | 12/2008 | Chen et al. |
| 2010/0031677 A1 | | 2/2010 | Lifson et al. |
| 2010/0083678 A1 | * | 4/2010 | Lifson ...................... F25B 1/10 62/115 |
| 2010/0199707 A1 | | 8/2010 | Pearson |
| 2010/0281894 A1 | | 11/2010 | Huff |
| 2010/0326105 A1 | * | 12/2010 | Casas Noriega ...... B64D 13/08 62/196.1 |
| 2011/0005244 A1 | | 1/2011 | Finney et al. |
| 2011/0048042 A1 | | 3/2011 | Chen et al. |
| 2011/0239668 A1 | | 10/2011 | Qiao et al. |
| 2012/0011866 A1 | * | 1/2012 | Scarcella ................. F25B 1/10 62/79 |
| 2012/0036854 A1 | | 2/2012 | Vaisman et al. |
| 2012/0067055 A1 | | 3/2012 | Held |
| 2013/0233003 A1 | | 9/2013 | Piesker et al. |

OTHER PUBLICATIONS

Int'l Search Report for PCT/US2013/067640 mailed Apr. 29, 2014.
English Abstract for JP2008224118A.

* cited by examiner

ADAPTIVE TRANS-CRITICAL CARBON DIOXIDE COOLING SYSTEMS

CROSS-REFERENCE TO RELATED APPLICATIONS

This application is a continuation-in-part of and claims priority to U.S. patent application Ser. No. 14/109,416, filed Dec. 17, 2013, which claims priority to U.S. Provisional Patent Application No. 61/785,900, filed Mar. 14, 2013, both of which are hereby incorporated by reference in their entirety.

FIELD OF TECHNOLOGY

An improved method of operating a cooling system in an aerospace application is disclosed, and more particularly, an improved method of operating the cooling system includes operating in trans-critical or sub-critical modes.

BACKGROUND

It has become increasingly desirable to improve cooling systems in aerospace applications. Typically, cooling systems provide air conditioning, refrigeration and freezer services, and the like for commercial and other aerospace systems. In general, various known options are available for providing cooling, but such options have drawbacks that limit the design options for aerospace applications.

One known option includes a vapor compression cycle. Vapor compression cycles pass a refrigerant through two-phase operation and can operate efficiently and take advantage of the thermal carrying capacity of a liquid, as opposed to a gas, as well as take advantage of the heat of vaporization of the liquid refrigerant. Thus, through portions of the vapor compression cycle, the cooling system can be much more compact when compared to a gas or air-based system because the fluid being carried is in liquid form. However, vapor compression cycles typically are limited to lower ambient temperature operation and may not provide useful solutions for high ambient temperature operation.

Another known option is a single-phase gas-based system using a gas such as air as the refrigerant. However although air can serve usefully as a refrigerant medium, air is not an efficient thermal fluid, as its heat capacitance is limited to a function of its mass flow rate and heat capacity. Thus, gas-based systems are typically less efficient than vapor compression systems and are typically, for that reason alone, larger than vapor compression systems. Additionally, air systems typically include significant duct passages in order to carry the amount of air that is desired to achieve the amount of cooling typically used for aerospace purposes.

To accommodate the wide range of possible ambient operating conditions of the aircraft, cooling systems for aerospace applications typically use a gas-based system. That is, although it is desirable to reduce mass and bulk in aircraft or aerospace applications, typical cooling systems nevertheless include a more bulky and less efficient gas-based system in order to cover the range of conditions that can be experienced.

Typically, aircraft operate in a range of operating conditions, during which their cooling systems may be required to operate as well. In one example, the aircraft may reside on a tarmac, such as when taxi-ing for departure, loading passengers or cargo, or awaiting for weather conditions to approve. In another example, the aircraft may be operated at high elevation. In yet another example, the aircraft may be operated in transition and during climbing to elevation. Such operation can present challenges to operation of the refrigeration system, as the condenser and the overall cooling system can be exposed to a wide variety of temperatures and conditions during this range of potential operating conditions.

As such, there is a need to improve cooling systems that can operate over a wide range of operating conditions in an aircraft.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary cooling system for an aircraft application is described herein, and various embodiments thereof.

A cooling system includes a first heat exchanger, an evaporator coupled to a thermal load of an aircraft. first and second cooling circuits coupled to the heat exchanger, the first and second cooling circuits selectable via a set of cooling circuit valves that are arranged to direct a refrigerant through the first circuit, the second circuit, or both the first and second circuits based on air passing through the first heat exchanger at ambient conditions of the aircraft, and a receiver configured to accumulate reserve refrigerant to provide flexibility in system operation as the cooling system operates in sub-critical, trans-critical, and super-critical modes of operation.

Another exemplary illustration includes a method of operating a cooling system, the method includes operating a set of valves that cause a refrigerant to pass through a heat exchanger and direct the refrigerant through a first cooling circuit, a second cooling circuit, or both depending on ambient conditions, and accumulating reserve refrigerant in a receiver to provide flexibility in system operation as the cooling system operates in sub-critical, trans-critical, and super-critical modes of operation.

Figure 1:
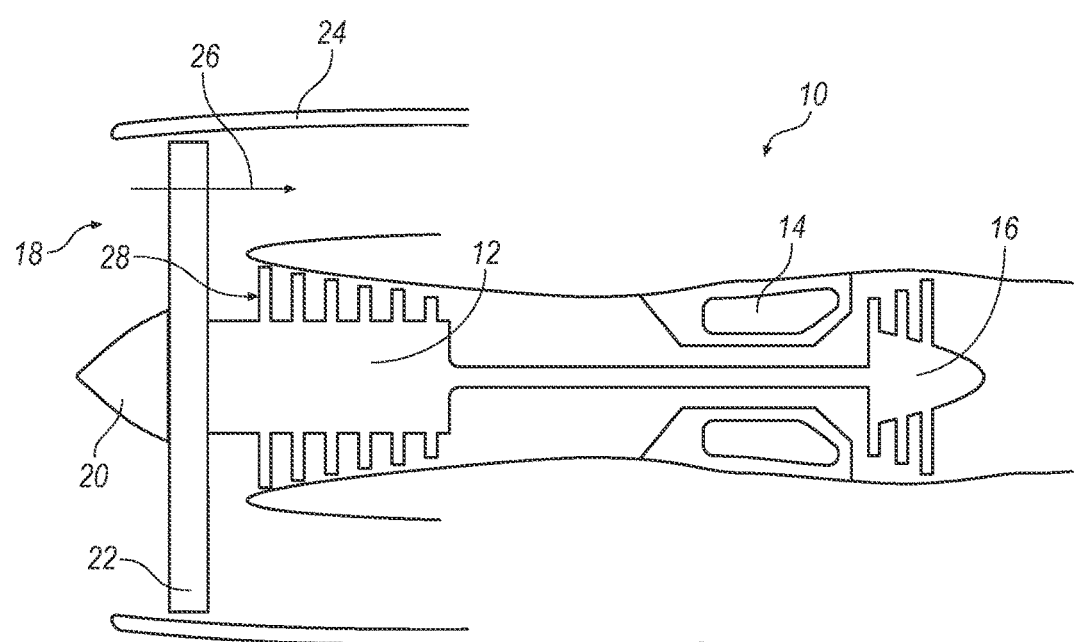
FIG. 1 is an illustration of a gas turbine engine employing the improvements discussed herein.

Turning now to the drawings, FIG. 1 illustrates a schematic diagram of a gas turbine machine 10 that is a primary mover or thrust source for an aircraft, utilizing the improvements disclosed herein. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. Components of turbine machine 10 and as illustrated in FIG. 1 generally do not correspond to components of embodiments of the cooling system in subsequent figures. That is, components of FIG. 1 generally correspond to components of an aircraft engine, whereas components in the subsequent figures (i.e., turbine, compressor) are components dedicated to the cooling systems described and are separate from the components of turbine machine 10.

Figure 2:
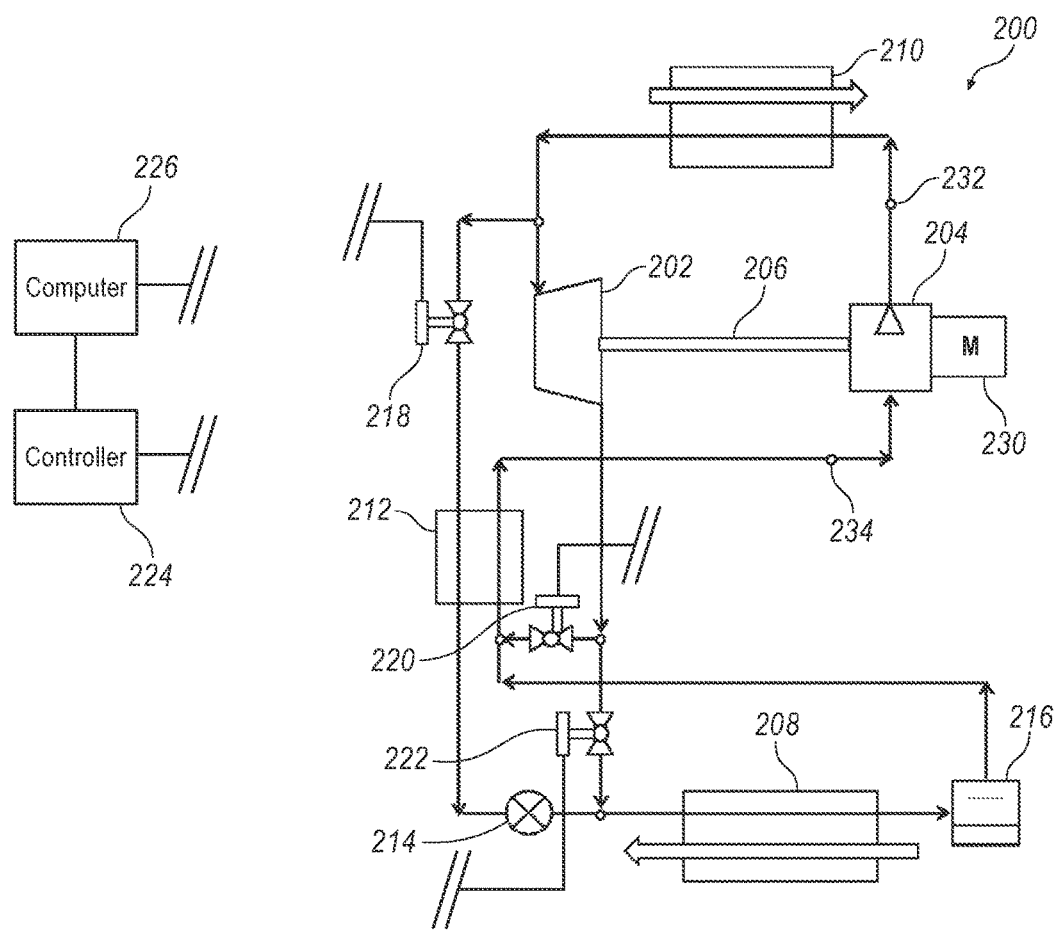
FIG. 2 is an illustration of a cooling system having optional valve-controlled refrigerant flow paths.

FIG. 2 illustrates a schematic diagram of a cooling system having valve-controlled refrigerant flow paths that are selected based on the heat rejection source and thermal loads. Cooling system 200 includes a refrigerant circuit with a compressor 204, a heat rejection exchanger 210, two parallel expansion circuits, an evaporator 208, and a suction accumulator 216. The heat rejection exchanger 210 is cooled by a cooling fluid and may operate as a condenser or a gas cooler. One expansion circuit has a valve 218, a recuperative heat exchanger 212, and an expansion device 214. The other expansion circuit with an expansion machine (expander or turbine) 202 has two lines downstream from the expander. One line having a valve 222 communicates directly with the evaporator 208. The other line feeds a low pressure side of the recuperative heat exchanger 212 and transfers its enthalpy to a high pressure stream feeding the evaporator 208 via the expansion device 214 when the valve 218 is open.

Cooling fluid states at the inlet to the heat rejection exchanger and thermal loads on the evaporator define the operating conditions of the cooling system.

The heat rejection heat exchanger 210 may be cooled by different fluids: air, fuel, RAM air, hydrogenated polyalphaolefin (PAO), water, any secondary refrigerant, fan bypass air or any available appropriate engine stream, as examples. As such, heat is rejected from system 200 via heat rejection heat exchanger 210, and the heat rejection rate is defined by parameters of state of the cooling fluid. Parameters of state of the cooling fluid depend on the application and the fluid itself. For instance, operating conditions of the aircraft may include low static ambient temperatures and low pressures that occur when the aircraft is at high altitude, while high static ambient temperatures and pressures may occur at low altitude or at conditions on a tarmac. These static ambient pressure and temperature, Mach number, and pressure and temperature on the ground define the parameters of RAM air entering the heat rejection exchanger.

The expansion device 214 is an orifice, a thermal expansion valve, an electronic expansion valve, a capillary tube or any other device providing isenthalpic expansion.

The expander reduces enthalpy and does not provide isenthalpic expansion. The expander 202 is designed as a two-phase expander which means that the leaving state is a two-phase mixture; however, expander 202 can handle single phase processes in a vapor area. Expander 202 is coupled to compressor 204 via a rotational shaft 206. The power generated in the expander 202 is not sufficient to drive the compressor 204. Therefore, the compressor 204 employs a motor 230 to compensate insufficient power.

A heat source for evaporator 208 is associated with objects to be cooled (power electronics, HVAC for cabins and passenger compartments, and other mission systems, as examples). The evaporator 208 may cool air in a flight deck, a passenger compartment, or electronics, as examples. Alternatively evaporator 208 can cool any of those or all of those via a coolant, which could be PAO, water, a water glycol mixture, or any other secondary refrigerant. Objects to be cooled, such as electronic devices, may be mounted on cold plates, which has channels for boiling refrigerant to execute direct cooling by the refrigerant. The system may have multiple condensers using the same or different heat sinks. Also, the system may have multiple evaporators using the same or different heat sources and loads.

The suction accumulator 216 provides charge management and is part of the capacity control strategy. When the system cooling capacity exceeds the demand, the non-evaporated refrigerant is stored in the suction accumulator 216. In the case of a capacity shortage, the accumulated refrigerant evaporates and resumes operation.

Solenoid valves 218, 220, and 222 control operation thereof. In one embodiment, cooling system 200 includes a controller 224 that in one example is controlled by a computer 226. Valves 218, 220, and 222 are controlled and direct refrigerant flow according to the ambient conditions, or operating conditions of the aircraft.

Valves 218, 220, and 222, may be actuated electrically via solenoids pneumatically, or by any other means. There is an option when the system does not have valve 220 and its related line. In one case the recuperative heat exchanger 212 is optional. Also, there is another option when the system does not have the valve 222 and its related line.

System 200 is designed to operate at a wide operating range of pressures and temperatures in the evaporator 208, below and above the critical point. The system may operate at evaporator pressures below the critical point to enable execution of heat absorption and cooling duty by boiling the refrigerant in evaporator 208.

The heat rejection can be processed above or below the critical point, via selected operation of valves 218, 220, and 222. If the heat rejection process is below the critical pressure (when the cooling fluid temperature is low) then the system operation is sub-critical and the heat rejection exchanger operates a condenser. Otherwise, when the cooling fluid temperature is high, the heat rejection exchanger operates a gas cooler, the system implements a trans-critical cycle providing that the evaporating pressure is still below the critical pressure.

During transient processes a combination of a load on the evaporator and cooling fluid temperature and heat rejection capability may move the evaporating pressure up above the critical point. In such cases the evaporator operates as a single phase heat exchanger, and these are the cases when the system operation is supercritical.

When cooling fluid temperature is high and pressure in the heat rejection exchanger is above critical, the isenthalpic expansion in the expansion device 214 itself may not contribute a feasible cooling effect and the expansion in the expander 202 is dominant. If pressure in the evaporator is above or around the critical pressure (the supercritical mode) the valves 218 and 220 are closed; and valve 222 is open. If pressure in the evaporator is sufficiently below the critical pressure (trans-critical mode) the valves 218 and 220 are opened and the valve 222 is closed to avoid circulation of excessive amount of vapor through the evaporator and associated excessive refrigerant pressure drop.

When cooling fluid temperature is low enough to drive the compressor discharge pressure below the critical pressure the contribution of the expander degrades, the solenoid valves 220 and 222 may be closed. This occurs when the thermodynamic state leaving the expansion device 214 contains a feasible amount of liquid phase, or in other words, when the vapor quality of the refrigerant entering the evaporator is adequately low.

Thus, a control strategy is based upon pressures and vapor quality entering the evaporator.

One capacity control strategy includes sensing a refrigerant pressure on the high pressure side, a refrigerant temperature at the inlet to the expansion device 214, and a refrigerant pressure on the low pressure side. The pressure on the high side and the temperature at the inlet to the expansion device 214 define refrigerant enthalpy entering the evaporator; this enthalpy and the low side pressure define refrigerant vapor quality entering the evaporator.

In general, this control strategy includes appropriately positioned pressure (232 and 234) and a temperature sensor (not shown) at the inlet to the expansion valve 214. The sensors 232, 234 may shut the system off when the discharge pressure is above a set head pressure limit, or when suction pressure is below a set suction pressure limit.

To distinguish supercritical operation the pressure sensor 234 is positioned on the suction side of compressor 204 (in systems having LP and high pressure HP compressors, it is typically the suction side of the LP compressor that is of controlling interest). If the evaporating pressure is above the critical pressure (or is slightly lower), solenoid valves 218, 220 are off and the system implements a supercritical cycle, particularly, a Brayton Cycle system, and a single phase stream leaving the expander feeds the heat exchanger 208.

The sensor 232 distinguishes trans-critical and sub-critical operation. Under low temperature cooling fluid conditions (i.e., in flight and at high elevation at temperatures where a refrigerant such as $CO_2$ may be a liquid), first valve 218 is open and second and third valves 220, 222 are closed to direct refrigerant flow through expansion valve 214 as a liquid (sub-critical operation). Under high temperature cooling fluid conditions (i.e., when the aircraft is parked or during low elevation flight, or during transition to high elevation and at temperatures where a refrigerant such as $CO_2$ is a gas) and thermal loads driving the pressure in the evaporator are above the critical point, operation is altered to direct the refrigerant flow through expander 202 (supercritical operation) and valves 218, 220 are off. At other conditions (trans-critical operation) valves 218 and 220 are on and the valve 222 is off when the vapor quality is not low enough; the valve 218 is on and the valves 220 and 222 are off when the vapor quality is low enough.

Further, when expander 202 is operated as described and as it expands refrigerant therein, because of its rotational coupling to compressor 204, compressor 204 is thereby operated and driven by expander 202 in addition to the power input provided by an electrical drive. However, when expander 202 is bypassed (decoupled from the compressor and not rotated) and refrigerant is passed to expansion device 214, compressor is thereby driven by an electrically driven motor 230 only.

$CO_2$ (carbon dioxide), which enables the trans-critical, sub-critical, and super-critical operation, is therefore a refrigerant of choice for use with system 200. It will be appreciated that another trans-critical, sub-critical and super-critical refrigerant could be employed. If there is a need to elevate the critical point and extend the two phase region in order to improve the overall system performance a $CO_2$ based mixture (such as $CO_2$ and propane) may be selected as a refrigerant. As such, $CO_2$ serves as a refrigerant that spans the range of operating conditions that may be experienced as changing ambient conditions of, for instance, the aircraft. Exiting the heat rejection exchanger $CO_2$ is a gas when the temperature and pressure are above critical and is a liquid when the temperature and pressure are below critical. When passed through first valve 218 to expansion device 214, $CO_2$ is in gaseous form (provided that the pressure after expansion is above the critical point) or in two-phase form (provided that the pressure after expansion is below the critical point). When passed through expander 202 with first valve 218 closed and as described above, $CO_2$ is in gaseous form (provided that the pressure after expansion is above the critical point) or in two-phase or vapor form (provided that the pressure after expansion is below the critical point).

Figure 3:
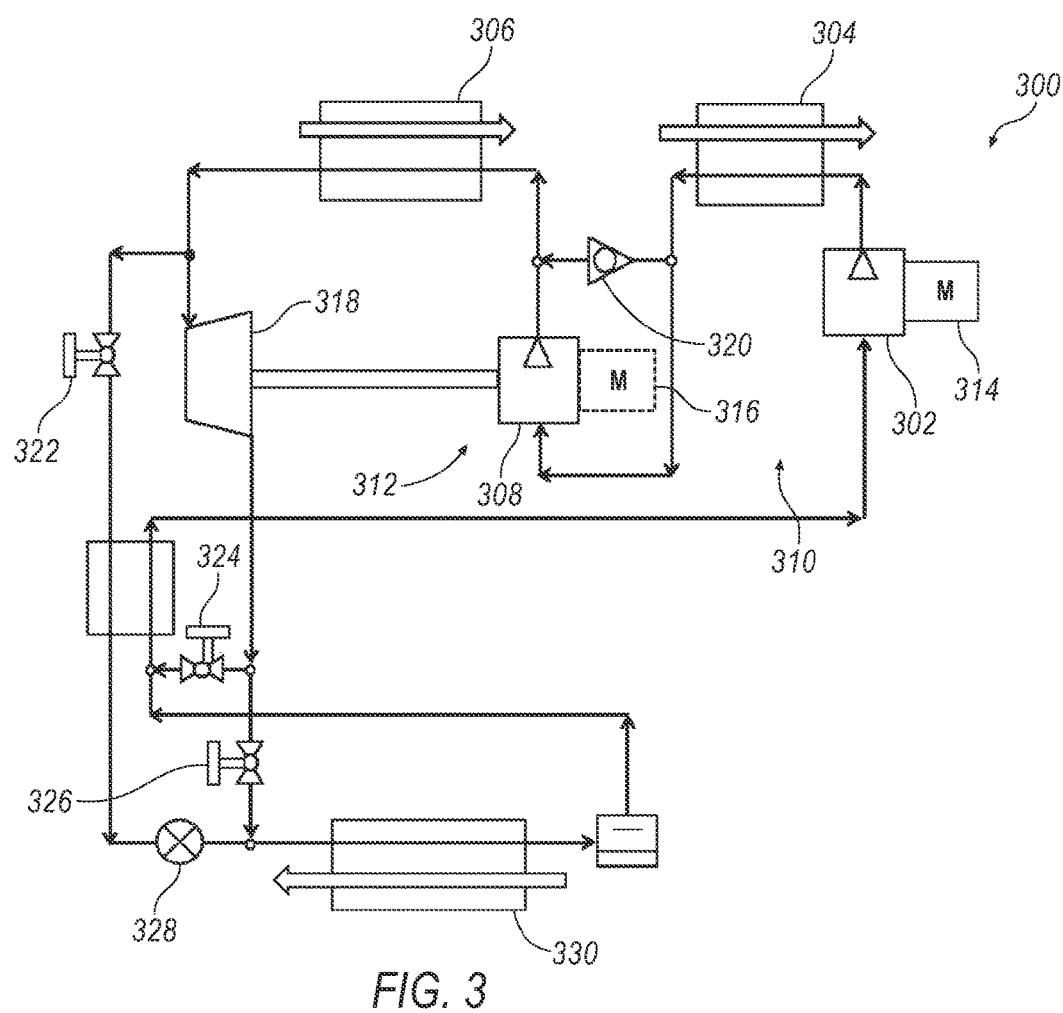
FIG. 3 is an illustration of a cooling system having a second compressor.

FIG. 3 illustrates a schematic diagram of an alternative cooling system having valve-controlled refrigerant flow paths that are selected based on ambient conditions or the operating conditions of the aircraft, according to another embodiment. Cooling system 300 operates in a fashion similar to that of cooling system 200 of FIG. 2, but the single stage compression is replaced by a two-stage compression. The two-stage compression may be implemented by a two-stage compressor or by a combination of a low pressure compressor and a high pressure compressor. The two-stage compression provides an opportunity to drive one compressor stage by the expander and other compressor by an electrical motor, such as motor 314. In one example, the low pressure compression stage, the high pressure compression stage, the expander, and the motor are on the same shaft.

The cooling system includes a low pressure compressor 302, a high pressure compressor 308, and a gas cooler 304 in addition to those of FIG. 2. The gas cooler 304 (and the heat rejection exchanger 306) may be cooled by fuel, air, RAM air, PAO, water, or any other secondary refrigerant, fan bypass air, or any available appropriate engine stream. The expander 318 drives the high pressure compressor 308 and the low pressure compressor 302 is driven by an electrical motor. Alternatively, it is possible to arrange that the low pressure compressor is driven by the expander and the high pressure compressor is driven by the motor (illustrated as element 316 as dashed lines), in which case expander 318 would be connected to low pressure compressor 302.

The heat rejection exchanger 306, comparable in location to that of heat rejection exchanger 210 of FIG. 2, may nevertheless differ in design and operation because of the two-stage heat rejection design of cooling system 300. Also, the heat rejection heat exchanger 306 may be combined with the gas cooler 304 and operate as one device. Similarly, compressor 308 is positioned in a location that is comparable to compressor 204 of FIG. 2.

Operation of cooling system 300 is therefore two-stage in that refrigerant passes through compressor 302 in a first stage of compression 310, heat is rejected to gas cooler 304, and refrigerant is passed to the compressor 308 in a second stage of compression 312 before entering heat rejection heat exchanger 306. The compressor 302 is therefore designated as a low pressure (LP) compressor and the compressor 308 is a high pressure (HP) compressor (for a second stage of compression 312), due to the pressures in their relative locations in the system 300.

In one embodiment a check valve 320 may be included to enable bypassing compressor 308 that is driven by the expander 318 at certain combinations of low cooling fluid temperatures and thermal loads on an evaporator 330. The check valve is added to enable operation of the LP compressor when the expander and the HP compressor are off.

Cooling system 300 is operated in a fashion similar to system 200, but with the two stages of compression 310, 312 as discussed. System 300 is therefore operable via valves 322, 324, and 326 in the fashion as described in order to selectively operate expansion devices such as expansion device 328 and expander 318, depending on sub-critical, trans-critical, or super-critical operation.

Figure 4:
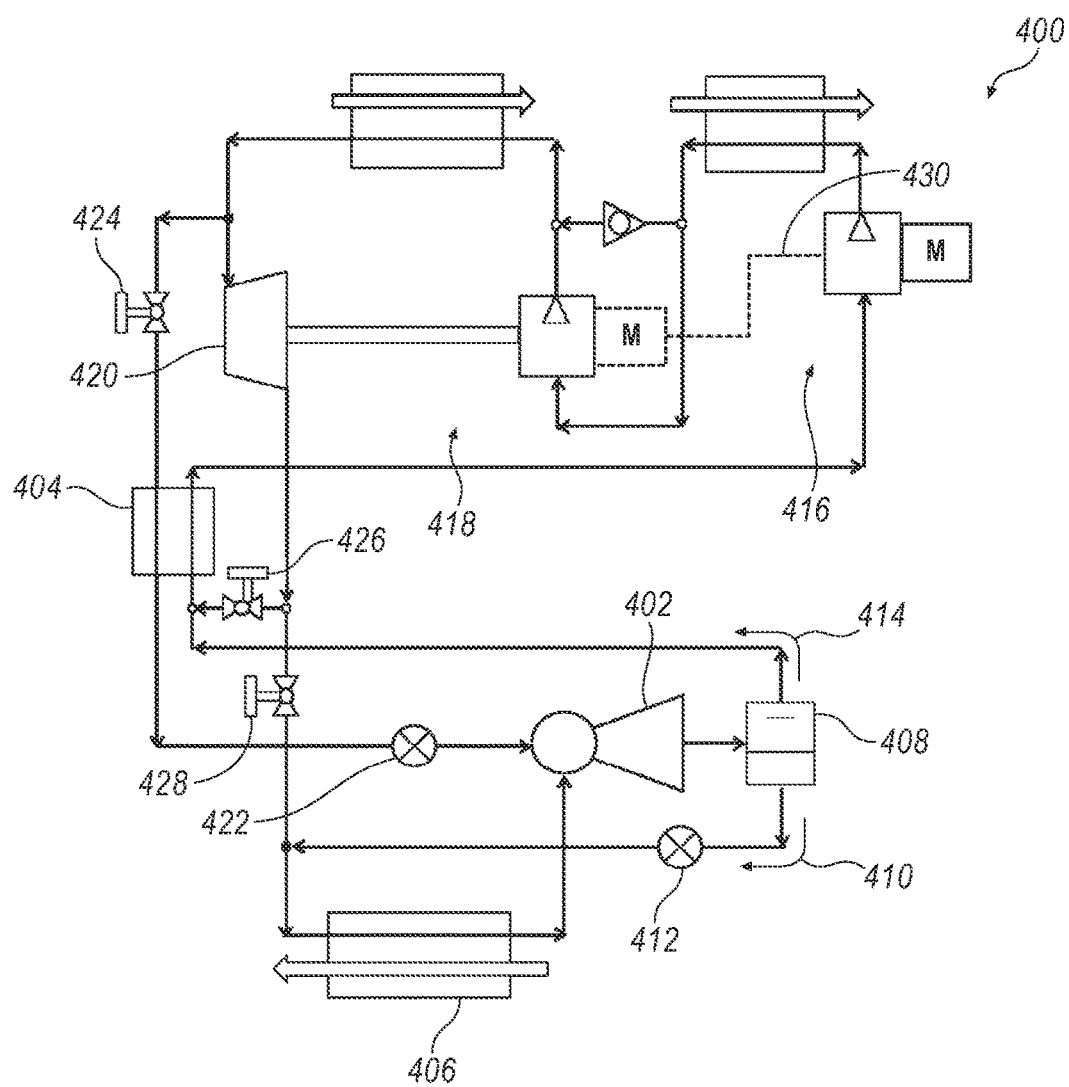
FIG. 4 is an illustration of a cooling system having an ejector for operating as a booster compressor.

FIG. 4 illustrates a schematic diagram of an alternative cooling system having valve-controlled refrigerant flow paths that are selected based on the ambient conditions or operating conditions of the aircraft. Cooling system 400 operates in a fashion similar to that of previously described cooling systems 200, 300, but includes an ejector 402 for boosting compression of the refrigerant before the refrigerant passes to the subsequent compression cycle(s). The ejector 402 is fed by a high pressure refrigerant stream when a solenoid valve 424 is open. This stream is a motive stream. The ejector expands the motive stream and, using the energy of the motive stream, drives/ejects a low pressure stream from evaporator 406, forming a two-phase mixture at the exit. The ejector discharges the refrigerant stream at a pressure higher than the evaporating pressure to a liquid separator 408 in which liquid is extracted 410, passed to expansion device 412 and then to evaporator 406. Refrigerant also passes from liquid separator 408 as a stream or vapor 414 and then passes to first stage compression 416 and to second stage compression 418, as described above with respect to cooling system 300. According to one embodiment, system 400 includes an expansion device 422 that provides refrigerant expansion prior to entering ejector 402.

In addition to a liquid separation function, the liquid separator provides the charge management for capacity control (instead of the suction accumulator). Thus, ejector 402 operates as an expansion device and as a boost compressor, which boosts gas pressure prior to entering first stage 416, and leading to an overall decreased pressure differential across the compression stages, improving overall performance. System 400 is therefore operable via valves 424, 426, 428 in the fashion as described in order to selectively operate expansion devices, such as expander 420 and expansion device 422, depending on sub-critical, trans-critical, or super-critical operation.

Further, it is contemplated that ejector 402 may be used in a cooling system having, for instance, only a single stage of compression. For instance, as described above system 200 of FIG. 2 includes a single stage of compression, and thus in one embodiment ejector 402 as described with respect to system 400 of FIG. 4 may be included in systems in which one stage of compression is included. In addition, according to one alternative, both compressors may be coupled to one another through a shaft 430 that is common to expansion device 420. In one example, system 400 includes a recuperative heat exchanger 404.

Figure 5:
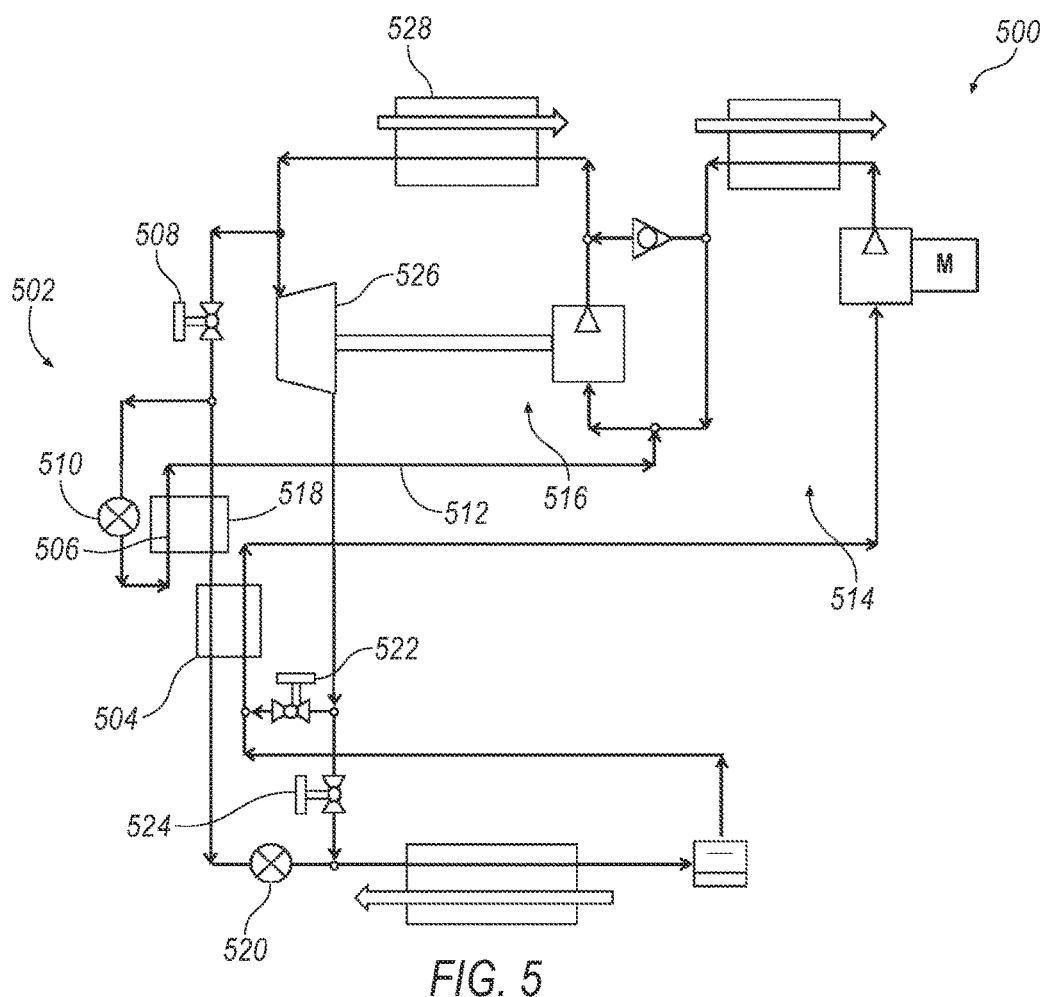
FIG. 5 is an illustration of a cooling system having a secondary expansion loop.

Referring to FIG. 5, an alternative cooling system 500 includes an economizer cycle 502 in which, in addition to recuperative heat exchanger 504 as in previous systems, a second recuperative heat exchanger 506 is included. The refrigerant, having passed through valve 508, is expanded in a separate expansion device 510, is passed through second recuperative heat exchanger 506, and is passed as an additional vapor line 512 to combine with refrigerant passing from first stage compression 514 to second stage compression 516. As such, overall system performance is improved as a portion of refrigerant stream passing through valve 508 is expanded in device 510, and passed through second recuperative heat exchanger 506 such that its component 518 is cooled yet further prior to entering heat exchanger 504 and expansion device 520. The second recuperative heat exchanger 506 enables additional cooling of the high pressure stream which improves cooling capacity of the system recompressing refrigerant from intermediate pressure to high pressure. Economizer cycle 502 thus enhances the conditions for overall system cooling when valves 508, 522, and 524 are operated to bypass expander 526, increasing the refrigerant flow for heat rejection in condenser cooler or condenser 528.

The illustrated embodiment has a low pressure compressor and a high pressure compressor. Alternatively, the cooling system may have a compressor with an economizer port. The compressor may be placed on the same shaft with the expander 526 and a motor. The economizer port represents a state between the LP compressor and the HP compressor.

Figure 6:
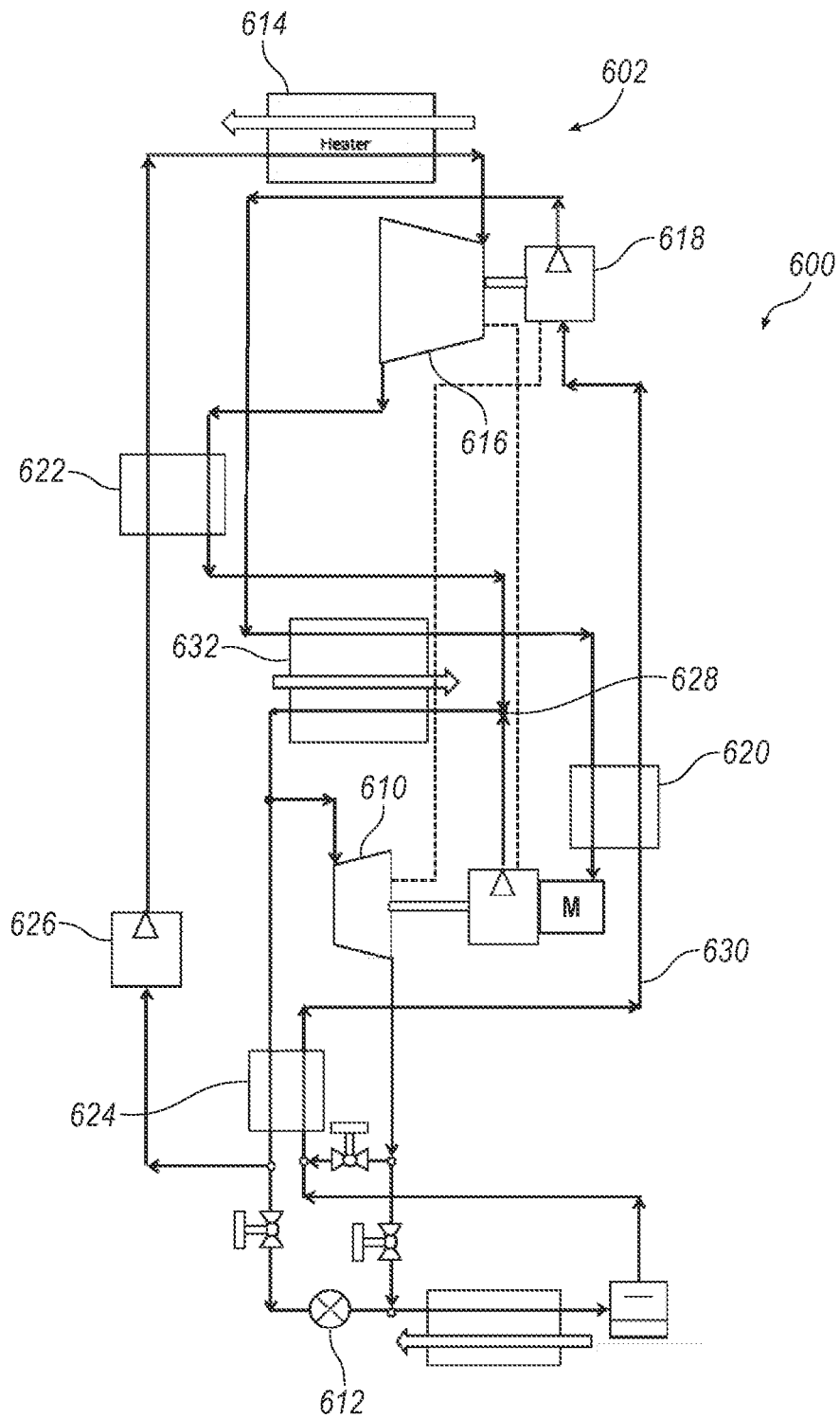
FIG. 6 is an illustration of a cooling system driven in part thermally by a waste heat source.

Referring to FIG. 6, an alternative cooling system 600 operates as described with the disclosed systems above, but with the additional benefit of a thermally driven portion 602 that is driven by waste heat or by heat extracted from the high temperature source generated in the engine or in the aircraft, in one embodiment. The system incorporates a power generation circuit and a cooling circuit such as described above. The power generation portion includes a pump 626 (providing that it has liquid or at least sufficiently dense refrigerant at its inlet), optional recuperative heat exchanger 622, a heater 614, an expander 616, and a heat rejection exchanger 632. The heat rejection exchanger 632 is a common component for both circuits as a heat rejection exchanger. Such an embodiment provides an opportunity to drive the high pressure compressor stage by the two-phase expander 610 (by placing the high pressure compressor and the two-phase expander on the same shaft) and the low pressure compressor stage 618 by the vapor expander 616 (by placing the low pressure compressor and the vapor expander on the same shaft) without any electrical power input. In one example, the system includes one electrically driven device, pump 626. Alternatively, it is possible to arrange driving the low pressure compressor stage 618 by the two-phase expander 610 and the high pressure compressor stage by the vapor expander 616 (shown as dashed lines). There is an option to place the pump on one shaft with the expander 610 or with the expander 618 in order to avoid or reduce electrical input. Also, there is an option to place the low pressure compressor, the high pressure compressor, the two-phase expander, the vapor expander, and the pump on one common shaft. In addition a motor-generator may be added to the shaft to extract power when cooling capacity demands is reduced.

In another embodiment thermally driven portion 602 derives its heat not as waste heat, but from components in the aircraft or aircraft engine that operate at high temperature. In this case, including a motor-generator instead of a motor may be beneficial. The motor-generator may generate power when the cooling by the evaporator is not needed and cooling of a hot temperature source by the heater 614 is an option. As another option, the cooling system may be driven electrically when the hot temperature source is unavailable. Valves 604, 606, 608 may be operated in the fashion as described in order to selectively operate expansion devices such as expander 610 and expansion device 612, depending on sub-critical, trans-critical, or super-critical operation. However, in this embodiment waste heat from the aircraft is recovered via a heater 614, through which waste heat is passed (i.e., combustion products). Thermally driven portion 602 of system 600 includes expander 616 and a compressor 618, recuperative heat exchangers 620, 622, and 624, and pump 626. That is, in addition to the components of system 200 described with respect to FIG. 2, system 600 includes the additional components described that enable waste heat recovery from the aircraft, leading to higher system cooling output and more efficient operation.

In operation, liquid refrigerant is extracted after having passed through recuperative heat exchanger 624 and pumped via pump 626 through recuperative heat exchanger 622. The refrigerant is passed through heater 614 and the heated, high pressure refrigerant is expanded through expander 616 and power is extracted therefrom to drive compressor 618. Refrigerant that exits expander 616 passes through recuperative heat exchanger 622 and joins refrigerant flow from other portions of the circuit at junction 628. Refrigerant passing to thermally driving portion 602 arrives through refrigerant line 630, passes through recuperative heat exchanger 620, and to compressor 618, where the refrigerant is compressed and passed to heat rejection heat exchanger 632.

Heat rejection exchanger 632 is illustrated as a single device or heat exchanger, but in an alternate embodiment may be two separate heat exchangers for power generation and cooling portions of the system, and it is contemplated that the heat rejection is to coolant designated as an arrow that, in the two separate heat exchanger embodiment, passes to each of them.

In such fashion, waste heat from the aircraft (or heat from the cooled high temperature sources) is recovered and its energy is available to improve system cooling output and overall system efficiency. Recuperative heat exchangers 620, 622, 624 are available as positioned to jointly heat and cool as refrigerant passes in their respective directions, taking yet more advantage of the waste heat available to the system. Further, it is contemplated that all embodiments illustrated and described herein are controllable via a controller and computer, as described with respect to FIG. 2 above (with controller 224 and computer 226).

In an alternate embodiment, expander 610 is coupled to compressor 618, and compressor 616 is likewise coupled to the HP compressor as illustrated in the alternative provided that the check valve is repositioned accordingly.

Figure 7:
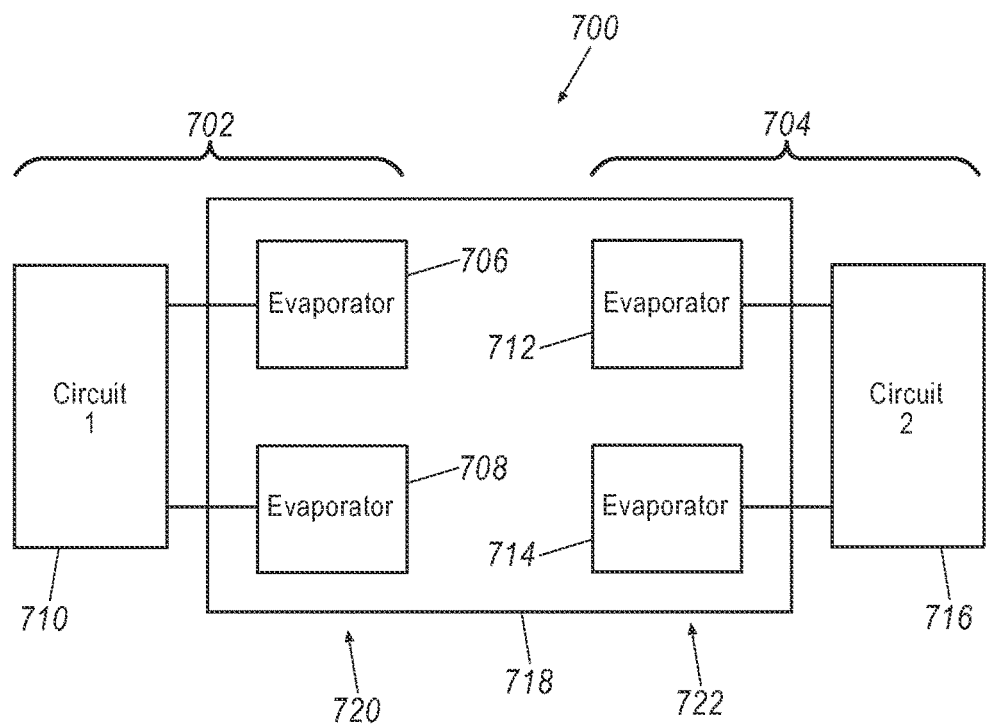
FIG. 7 is an illustration of a cooling system, having two cooling circuits, according to one example.
Figure 8:
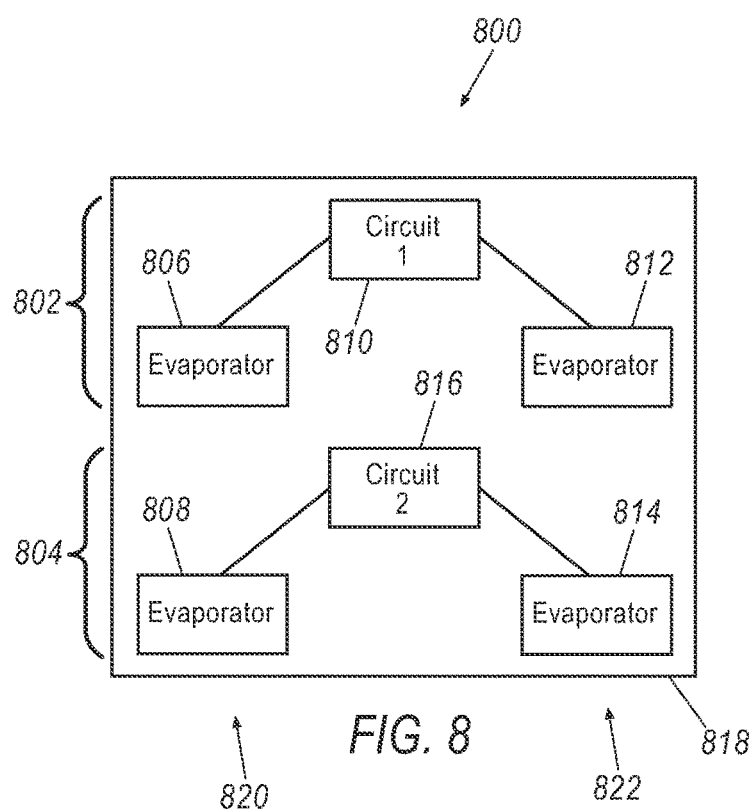
FIG. 8 is an illustration of a cooling system, having two cooling circuits, according to one example.

FIGS. 7 and 8 illustrate exemplary cooling systems, each having two cooling circuits, according to examples.

Referring to FIG. 7, a cooling system 700 is illustrated as a simple schematic to show a first cooling circuit 702 and a second cooling circuit 704. First cooling circuit 702 includes a first evaporator 706 and a second evaporator 708, each of which is coupled or otherwise fluidly connected to other components 710 of first cooling circuit 702, as will be further discussed. Likewise, second cooling circuit 704 includes a third evaporator 712 and a fourth evaporator 714, each of which is coupled or otherwise fluidly connected to other components 716 of second cooling circuit 704, as will be further discussed. Components 710 and 716, as will be further described, are operationally similar to the exemplary circuits illustrated in FIGS. 2-6.

Referring to FIG. 8, a cooling system 800 is illustrated as a simple schematic to show a first cooling circuit 802 and a second cooling circuit 804. First cooling circuit 802 includes a first evaporator 806 and a second evaporator 808, each of which is coupled or otherwise fluidly connected to other components 810 of first cooling circuit 802, as will be further discussed. Likewise, second cooling circuit 804 includes a third evaporator 812 and a fourth evaporator 814, each of which is coupled or otherwise fluidly connected to other components 816 of second cooling circuit 804, as will be further discussed. Components 810 and 816, as will be further described, are operationally similar to the exemplary circuits illustrated in FIGS. 2-6.

In general, cooling systems 700 and 800 may be implemented in an aerospace application such as an aircraft. In one example, block 718 of FIG. 7 is a simple schematic illustration of an aircraft, having a first side 720 and a second side 722. In another example, block 818 of FIG. 8 is also a simple schematic illustration of an aircraft, having a first side 820 and a second side 822. That is, in each system 700, 800, the first side 720, 820 corresponds in an example to a port side of the aircraft, and second side 722, 822 corresponds to a starboard side of the aircraft.

Thus, in both examples, a cooling system for an aircraft is illustrated that includes a first cooling circuit having a first evaporator and a second evaporator, and a second cooling circuit having a third evaporator and a fourth evaporator. In each case, as will be further illustrated, one of the first and second cooling circuits includes a first set of valves arranged to direct refrigerant through a first cooling sub-circuit, a second cooling sub-circuit, or both the first and second cooling sub-circuits based on ambient conditions. In each system, also, two of the evaporators are installed on a first side of the aircraft, and the other two of the four evaporators are installed on a second side of the aircraft opposite the first side.

Also, cooling systems 700, 800 include evaporators that each provide adequate cooling capability, while providing cooling to a pressurized stream of air and to a recirculation stream of air. For instance, system 700 includes first cooling circuit 702 having evaporator 706 for cooling a pressurized air stream, and evaporator 708 provides cooling to a recirculation stream. Second cooling circuit 704 includes evaporator 712 for cooling a pressurized air stream, and evaporator 714 provides cooling to a recirculation stream. In another example, system 800 includes first cooling circuit 802 having evaporators 806, 812, one of which cools a pressurized stream, and the other of which cools a recirculation stream. Second cooling circuit 804 includes evaporators 808, 814, one of which cools a pressurized stream, and the other of which cools a recirculation stream. Evaporators 806, 808, 812, and 814 of first and second cooling circuits are arranged such that, if one of cooling circuits 802 or 804 experiences a failure, then the remaining evaporators of the non-failed cooling circuit will still provide cooling to a pressurized stream and a recirculation stream. Thus, if one circuit fails then the other remains operational. Each system provides cooling to a pressurized stream of air. A portion of the pressurized air is ejected overboard and the remaining is re-circulated. One evaporator cools the pressurized stream and the second evaporator cools the re-circulated stream. Therefore, a certain amount of cooled/pressurized air, including a portion of the fresh air, enters the cabin and this amount is the sum of pressurized and re-circulated air. However, in one example a cooling system may not include two cooling circuits, but may include only one. Thus, according to one example, a cooling system may be included (referring to FIG. 7) in which only a cooling circuit 702 is included. Or, in another example (referring to FIG. 8), a cooling system may only include one of the cooling circuits, such as cooling circuit 802.

Figure 9:
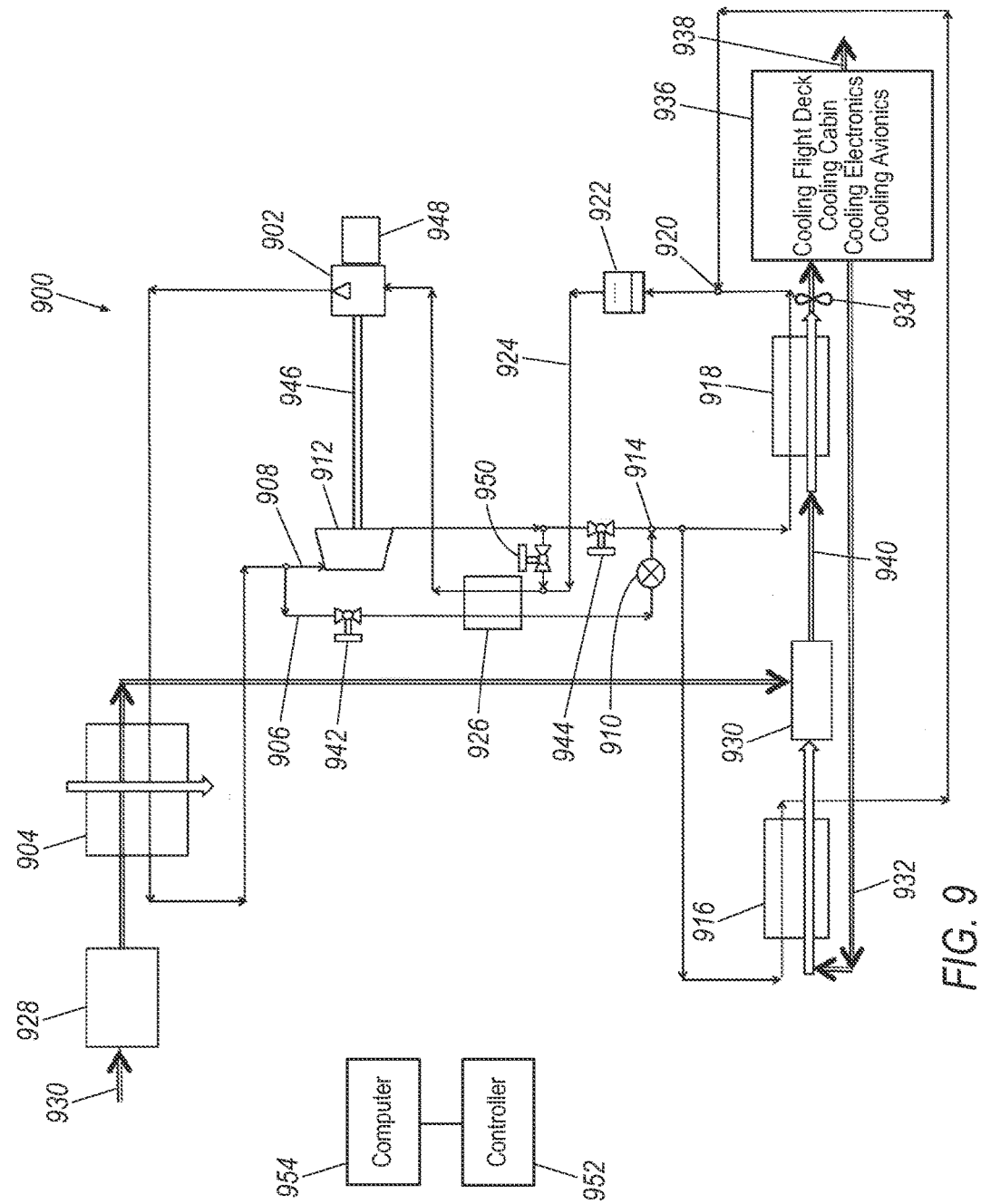
FIG. 9 is an exemplary illustration of one of the two cooling circuits for use in the cooling system illustrated in FIG. 7.
Figure 10:
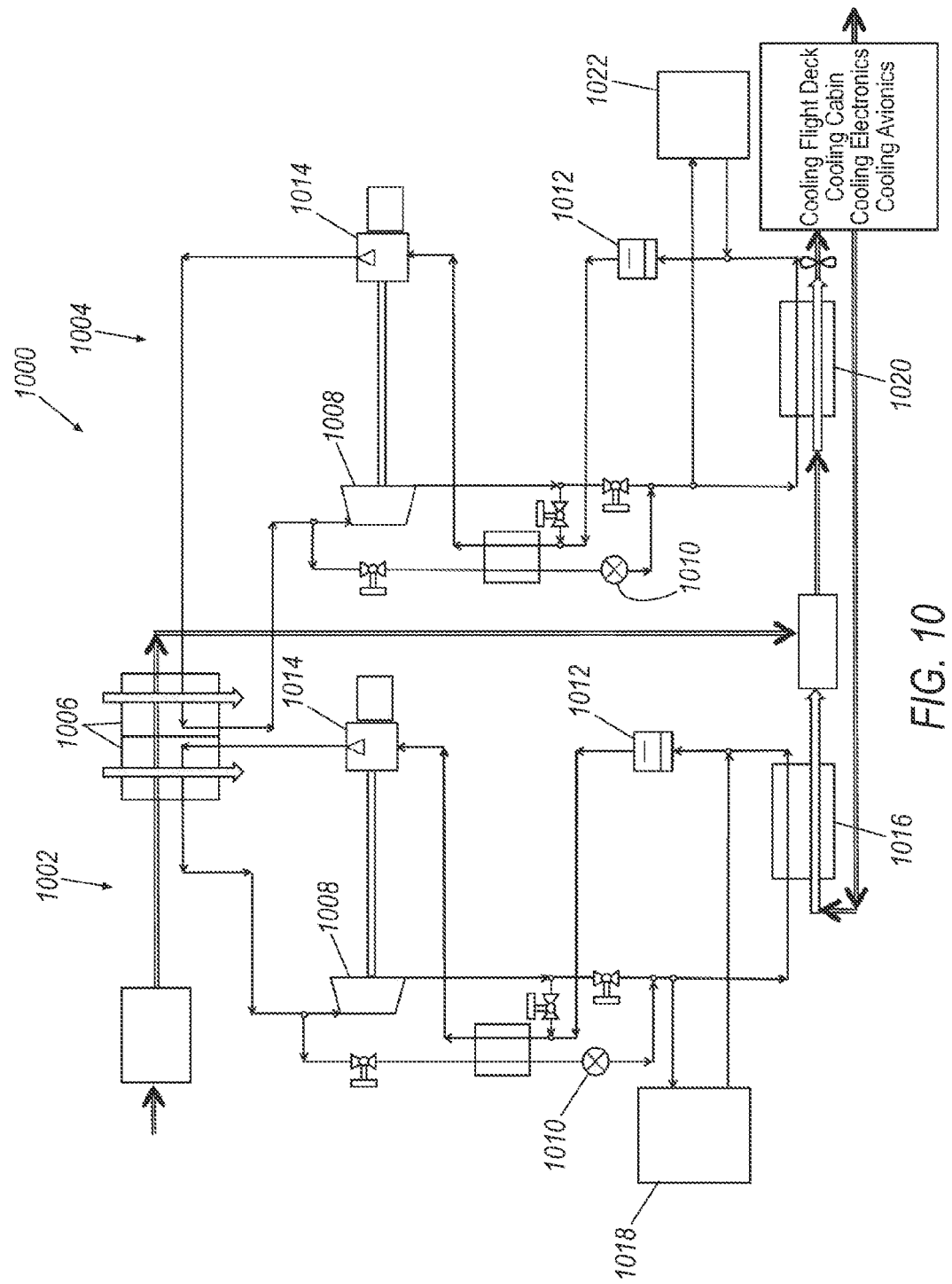
FIG. 10 is an exemplary illustration of the two cooling circuits for use in the cooling system illustrated in FIG. 8.

As stated, circuits 702, 704 and 802, 804 may have respective components arranged and configured to operate in manners consistent with the examples of FIGS. 2-6. To illustrate such arrangements, FIGS. 9 and 10 are examples that correspond generally to the example of FIG. 2 above. However, it is contemplated that other component arrangements, such as shown in FIGS. 3-6 above, may likewise be implemented in circuits 702, 704 and 802, 804 as well.

FIG. 9 corresponds to cooling system 700 of FIG. 7, but for simplicity of illustration, only one of the first and second cooling circuits 702, 704 is shown. Referring to FIG. 9, a cooling system 900 includes a refrigerant circuit with a compressor 902, a heat rejection exchanger 904, two parallel expansion circuits that are fed by a first line 906 toward a first cooling sub-circuit, and a second line 908 toward a second cooling sub-circuit. First line 906 is coupled to an evaporator 910, and second line 908 is coupled to an expansion machine (expander or turbine) 912. Lines 906 and 908, after passing through their respective evaporator 910 and expansion machine 912, rejoin at location 914. Refrigerant lines split at location 914 such that refrigerant passes to a first evaporator 916 and a second evaporator 918 connected in parallel. Refrigerant rejoins at location 920 after passing through evaporators 916, 918, and passes to a suction accumulator 922. A recuperative heat exchanger 926 is positioned to receive refrigerant in first line 906 and also in a line 924 that passes from suction accumulator 922.

A pressurized air source 928 provides supply air 930 that passes through heat rejection exchanger 904, and to a mixer 930. Mixer 930 thereby receives a source of air from source 928, which is mixed with air returning through an air recirculation circuit 932. Air is caused to flow in recirculation circuit 932 via a fan 934 that provides cooled air to elements 936 of the aircraft, such as the flight deck, the cabin, electronics, and avionics systems (communications, navigation, etc.). Thus, air is caused to flow to elements 936, some of which is ejected overboard 938, and some of which is recirculated 932 to first evaporator 916, and to mixer 930 where the recirculated air is mixed with source air 930. Mixed air from mixer is passed along line 940 to second evaporator 918. In such fashion, each evaporator 916, 918 cools return air 932 as well as mixed air 940.

The heat rejection heat exchanger 904 is combined with the preliminary heat exchanger of the air pressuring subsystem as shown in FIG. 8. An optional example is to include a stand-alone heat exchanger. The heat rejection exchanger 904 is cooled by a cooling fluid and may operate as a condenser or a gas cooler. One expansion circuit has a valve 942, the recuperative heat exchanger 926, and the expansion device 910. The other expansion circuit has two lines downstream from the expansion machine 912. One line having a valve 944 communicates directly with the evaporators 916, 918. The other line feeds a low pressure side of the recuperative heat exchanger 926 and transfers its enthalpy to a high pressure stream feeding the evaporators 916, 918 via the expansion device 910 when the valve 942 is open.

In one example, the heat rejection heat exchanger 904 is cooled by RAM air or by an engine stream. However, the heat rejection heat exchanger 904 may be cooled by different fluids: fuel, PAO, water, or by other fluids, as examples, in a standalone heat exchanger. Cooling fluid enters at the inlet to the heat rejection exchanger and thermal loads on the evaporator define the operating conditions of the cooling system. As such, heat is rejected from system 900 via heat rejection heat exchanger 904, and the heat rejection rate is defined by parameters of state of the cooling fluid. Parameters of state of the cooling fluid depend on the application and the fluid itself. For instance, operating conditions of the aircraft may include low static ambient temperatures and low pressures that occur when the aircraft is at high altitude, while high static ambient temperatures and pressures may occur at low altitude or at conditions on a tarmac. These static ambient pressure and temperature, Mach number, and pressure and temperature on the ground define the parameters of RAM air entering the heat rejection exchanger.

As examples, expansion device 910 is an orifice, a thermal expansion valve, an electronic expansion valve, a capillary tube or any other device providing isenthalpic expansion. The expansion machine 912 is designed as a two-phase expander which means that the leaving state is a two-phase mixture; however, expansion machine 912 can handle single phase processes in a vapor area. Expansion machine 912 is coupled to compressor 902 via a rotational shaft 946. Power generated in expansion machine 912, in some exemplary arrangements, may not be sufficient to drive compressor 902. Therefore, compressor 902 may employ a motor 948 to compensate for insufficient power.

A heat source for evaporator 916 is associated with objects to be cooled (power electronics, HVAC for cabins and passenger compartments, and other mission systems, as examples). Therefore, recirculating air 932 and mixed air 940 may cool air in a flight deck, a passenger compartment, or electronics, as stated. Alternatively evaporator 916 can cool any of those or all of those via a coolant, which could be PAO, water, a water glycol mixture, or any other secondary refrigerant. Objects to be cooled, such as electronic devices, may be mounted on cold plates, which has channels for boiling refrigerant to execute direct cooling by the refrigerant. The system may have multiple condensers using the same or different heat sinks. Also, the system may have multiple evaporators using the same or different heat sources and loads.

Suction accumulator 922 provides charge management and is part of a capacity control strategy. When the system cooling capacity exceeds the demand, the non-evaporated refrigerant is stored in suction accumulator 922. In the case of a capacity shortage, the accumulated refrigerant evaporates and resumes operation.

The solenoid valves 942, 944, and 950 control operation thereof. In one example, cooling system 900 includes a controller 952 that in one example is controlled by a computer 954. Valves 942, 944, and 950 are controlled and direct refrigerant flow according to the ambient conditions, or operating conditions of the aircraft.

Valves 942, 944, and 950, may be actuated electrically via solenoids, pneumatically, or by any other means. In one example, when system does not have valve 950 and its related line, in which case the recuperative heat exchanger 926 is optional. Also, there is another option when the system does not have the valve 944 and its related line.

System 900 is designed to operate at a wide operating range of pressures and temperatures in the evaporator, below and above the critical point. The system may operate at evaporator pressures below the critical point to enable execution of heat absorption and cooling duty by boiling the refrigerant in evaporators 916, 918.

The heat rejection can be processed above or below the critical point, via selected operation of valves 942, 944, and 950. If the heat rejection process is below the critical pressure (when the cooling fluid temperature is low) then the system operation is sub-critical and the heat rejection exchanger 904 operates as a condenser. Otherwise, when the cooling fluid temperature is high, the heat rejection exchanger 904 operates as a gas cooler, and the system implements a trans-critical cycle providing that the evaporating pressure is still below the critical pressure.

During transient processes a combination of a load on the evaporators, and cooling fluid temperature and heat rejection capability may move the evaporating pressure above the critical point. In such cases, one or both evaporators 916, 918 operate as a single phase heat exchanger, and these are the cases when the system operation is supercritical.

When cooling fluid temperature is high and pressure in the heat rejection exchanger is above critical, the isenthalpic expansion in the expansion valve 910 itself may not contribute a feasible cooling effect and the expansion in the expansion machine 912 is dominant. If pressure in the evaporator is above or around the critical pressure (the supercritical mode) the valves 942 and 950 are closed; and valve 942 is open. If pressure in evaporators 916, 918 is sufficiently below the critical pressure (trans-critical mode), valves 942 and 950 are opened and valve 944 is closed to avoid circulation of excessive amount of vapor through the evaporator and associated excessive refrigerant pressure drop.

When cooling fluid temperature is low enough to drive the compressor discharge pressure below the critical pressure the contribution of the expander degrades, the solenoid valves 950 and 944 may be closed. This occurs when the thermodynamic state leaving the expansion device 910 contains a feasible amount of liquid phase, or in other words, when the vapor quality of the refrigerant entering the evaporator is adequately low.

Thus, a control strategy is based upon pressures and vapor quality entering the evaporator.

One capacity control strategy includes sensing a refrigerant pressure on the high pressure side, a refrigerant temperature at the inlet to the expansion device 910, and a refrigerant pressure on the low pressure side. The pressure on the high side and the temperature at the inlet to the expansion device 910 define refrigerant enthalpy entering the evaporator; this enthalpy and the low side pressure define refrigerant vapor quality entering the evaporator.

In general, this control strategy includes appropriately positioned pressure sensors and a temperature sensor (not shown) at the inlet to the expansion valve 910. The sensors may shut the system off when the discharge pressure is above of a set head pressure limit or suction pressure is below a set suction pressure limit.

To distinguish supercritical operation the pressure sensor is positioned on the suction side of compressor 902 (in systems having LP and high pressure HP compressors, it is typically the suction side of the LP compressor that is of controlling interest). If the evaporating pressure is above the critical pressure (or is slightly lower), solenoid valves 942, 950 are off and the system implements a supercritical cycle, particularly, a Brayton Cycle system, and a single phase stream leaving the expander feeds the evaporators 916, 918.

A sensor distinguishes trans-critical and sub-critical operation. Under low temperature cooling fluid conditions (i.e., in flight and at high elevation at temperatures where a refrigerant such as $CO_2$ may be a liquid), valve 942 is open and valves 950, 944 are closed to direct refrigerant flow through expansion valve 910 as a liquid (sub-critical operation). Under high temperature cooling fluid conditions (i.e., when the aircraft is parked or during low elevation flight, or during transition to high elevation and at temperatures where a refrigerant such as $CO_2$ is a gas) and thermal loads driving the pressure in the evaporator above the critical point, operation is altered to direct the refrigerant flow through expansion machine 912 (supercritical operation) and valves 942, 950 are off. At other conditions (trans-critical operation) valves 942 and 944 are on and valve 944 is off when the vapor quality is not low enough; valve 942 is on and valves 950 and 944 are off when the vapor quality is low enough.

Further, when expansion machine 912 is operated as described and as it expands refrigerant therein, because of its rotational coupling to compressor 902, compressor 902 is thereby operated and driven by expansion machine 912 in addition to the power input provided by an electrical drive. However, when expansion machine 912 is bypassed (decoupled from the compressor and not rotated) and liquid refrigerant is passed to expansion device 910, compressor 902 is thereby driven by an electrically driven motor 948.

$CO_2$ (carbon dioxide), which enables the trans-critical, sub-critical, and super-critical operation, is therefore one refrigerant of choice for use with system 200. It will be appreciated that other trans-critical, sub-critical and super-critical refrigerants could be employed. If there is a need to elevate the critical point and extend the two phase region in order to improve the overall system performance a $CO_2$ based mixture (such as $CO_2$ and propane) may be selected as a refrigerant. As such, $CO_2$ serves as a refrigerant that spans the range of operating conditions that may be experienced as changing ambient conditions of, for instance, the aircraft. Exiting the heat rejection exchanger $CO_2$ is a gas when the temperature and pressure are above the critical ones and is a liquid when the temperature and pressure are below the critical ones. When passed through valve 942 to expansion device 910, $CO_2$ is in gaseous form (provided that the pressure after expansion is above the critical point) or in two-phase form (provided that the pressure after expansion is below the critical point). When passed through expansion machine 912 with valve 942 closed and as described above, $CO_2$ is in gaseous form (provided that the pressure after expansion is above the critical point) or in two-phase or vapor form (provided that the pressure after expansion is below the critical point).

Further, and as illustrated in FIG. 7, two cooling circuits 702 and 704 provide cooling to a pressurized stream and to a recirculation stream. Thus, correlating cooling system 900 of FIG. 9 to cooling system 700 of FIG. 7, evaporator 706 corresponds to evaporator 918 for pressurized air, and evaporator 708 corresponds to evaporator 916 for recirculation air. As stated, system 700 includes two cooling circuits that correspond to cooling system 900. Therefore, evaporator 712 also corresponds to evaporator 918 for pressurized air, and evaporator 714 corresponds to evaporator 916 for recirculation air. Thus, system 700 includes one cooling system 900 installed on the port (or left) side of the aircraft having an evaporator for the recirculation stream, and an evaporator for a pressurized air system is, and one cooling system 900 installed on the starboard (or right) side of the aircraft having a recirculation stream and a pressurized air system is.

Referring to FIG. 10, a system 1000 includes a first cooling circuit 1002 and a second cooling circuit 1004. FIG. 10, in contrast to FIG. 9 (which only shows one of the cooling circuits 702, 704), shows both cooling circuits 1002, 1004 that correspond to circuits 802 and 804 of system 800. Each circuit 1002, 1004 includes a respective heat exchanger 1006, expansion machine 1008, expansion valve 1010, suction accumulator 1012, and compressor 1014. First cooling circuit 1002 includes an evaporator 1016 and an evaporator 1018. Second cooling circuit 1004 includes an evaporator 1020 and an evaporator 1022. Each cooling circuit 1002, 1004, is operated in parallel and is coupled to cooling air (or other source) at heat exchangers 1006. Operation of each cooling circuit 1002, 1004 is also consistent with trans and sub-critical operation, consistent with the above description in the disclosed examples, pertaining to at least FIGS. 2-6 and 9, in which fluid is directed through a first sub-circuit that includes expansion devices 1010, or a second sub-circuit that includes expansion machines 1008.

Evaporators 1016-1022 are arranged to provide cooling for system 1000. That is, two of the evaporators 1016-1022 provide cooling for recirculation air, and two provide cooling for pressurized air. As such, evaporator 806 of system 800 corresponds to evaporator 1016 of system 1000 and cools recirculation air, and evaporator 812 of system 800 corresponds to evaporator 1020 and cools pressurized air. To provide the redundancy and to ensure continued operation (if one system fails), evaporator 1018 thereby provides cooling to pressurized air in cooling system 804 (and corresponds to evaporator 808), and evaporator 1022 thereby provided cooling to recirculation air in cooling system 804 (and corresponds to evaporator 814).

And, although cooling circuits 900 and 1000 were described in their operation as corresponding to FIG. 2 above, it is contemplated that other cooling circuits, such as those shown in FIGS. 3-6, may also be used in systems 700 and 800.

Referring to the previously disclosed systems, and FIG. 3 as an example, disclosed systems may experience improvement in a Coefficient Of Performance (COP), and increase volumetric cooling capacity at hot heat sink conditions. The disclosed systems may operate within a wide range of operating conditions which include combinations of heat rejection temperatures, heat absorption temperatures, and loads, and the disclosed systems may operate under sub-critical, trans-critical, and super-critical steady-state modes.

Figure 11:
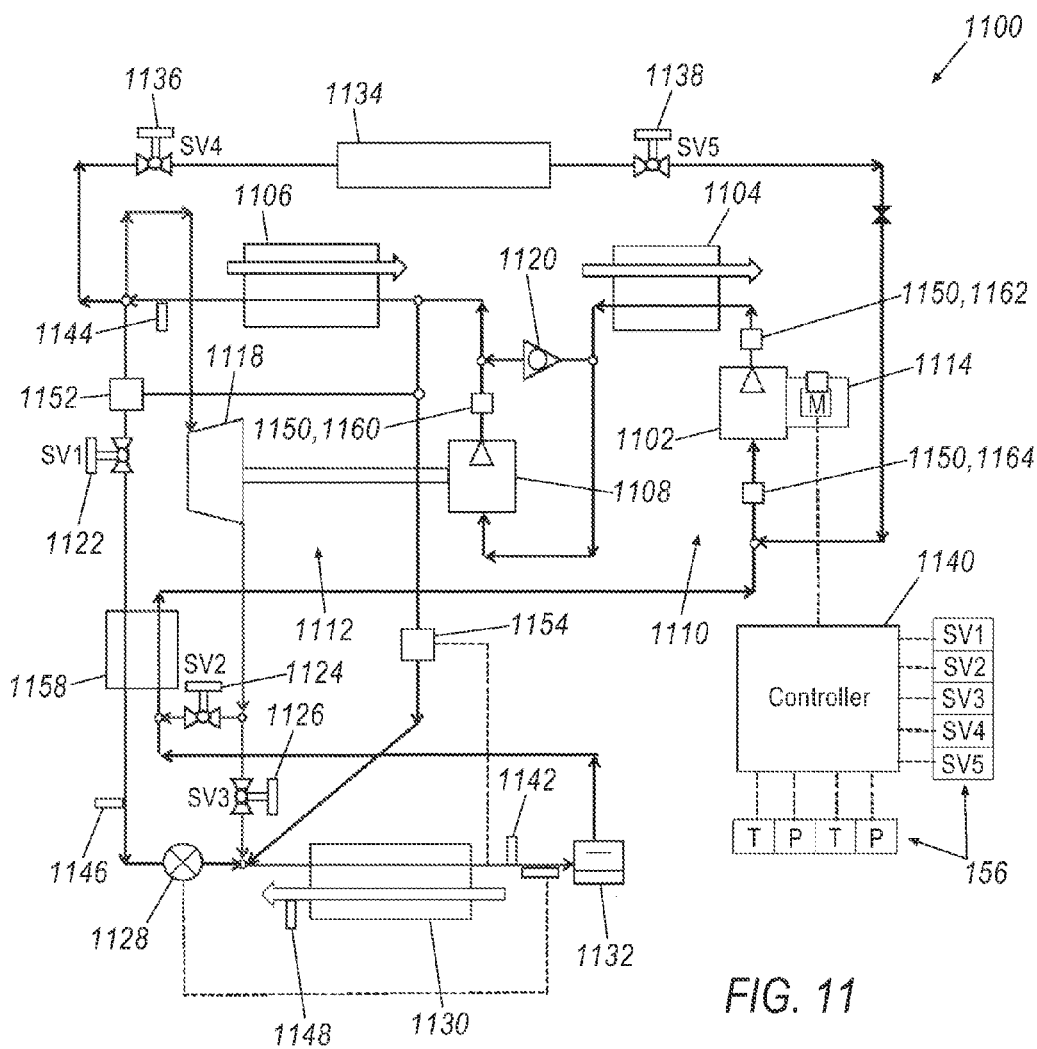
FIG. 11 is an exemplary illustration of a cooling system having a receiver, sensors, and control valves that are controllable in accordance with one embodiment.

FIG. 11, illustrates a schematic control diagram of a cooling system having valve-controlled refrigerant flow paths that are selected based on ambient conditions or the operating conditions of the aircraft, according to an embodiment. Cooling system 1100 operates in a fashion similar to that of cooling system 300 of FIG. 3. Two-stage compression may be implemented by a two-stage compressor or by a combination of a low pressure compressor and a high pressure compressor. The two-stage compression provides an opportunity to drive one compressor stage by the expander and other compressor by an electrical motor, such as motor 1114. In one example, the low pressure compression stage, the high pressure compression stage, the expander, and the motor are on the same shaft.

In one embodiment, the cooling system 1100 includes a low pressure compressor 1102, a high pressure compressor 1108, and a heat exchanger or gas cooler 1104. The gas cooler 1104 (and a heat rejection exchanger 1106) may be cooled by fuel, air, RAM air, PAO, water, or any other secondary refrigerant, fan bypass air, or any available appropriate engine stream. The expander 1118 drives the high pressure compressor 1108 and the low pressure compressor 1102 is driven by electrical motor 1114. Alternatively, it is possible to arrange that the low pressure compressor 1114 is driven by the expander and the high pressure compressor is driven by the motor.

In one example, the heat rejection heat exchanger 1106 may be combined with the gas cooler 1104 and operate as one device. Similarly, compressor 1108 is positioned in a location that is comparable to compressor 204 of FIG. 2.

Operation of cooling system 1100 is therefore two-stage in that refrigerant passes through compressor 1102 in a first stage of compression 1110, heat is rejected to gas cooler 1104, and refrigerant is passed to the compressor 1108 in a second stage of compression 1112 before entering heat rejection heat exchanger 1106. The compressor 1102 is therefore designated as a low pressure (LP) compressor and the compressor 1108 is a high pressure (HP) compressor (for a second stage of compression 1112), due to the pressures in their relative locations in the system 1100.

In one embodiment a check valve 1120 may be included to enable bypassing compressor 1108 that is driven by the expander 1118 at certain combinations of low cooling fluid temperatures and thermal loads on an evaporator 1130. The check valve is added to enable operation of the LP compressor when the expander and the HP compressor are off.

In another embodiment, system 1100 includes only one stage of compression, such as second stage of compression 1112 in which case compressor 1108 coupled to expander 1118 is included, and the first stage of compression 1110 is excluded. In this example, system 200 illustrated in FIG. 2 includes a receiver, control valves, pressure and temperature sensors, and the like, as described with respect to system 1100 in FIG. 11.

Cooling system 1100 is operated with the two stages of compression 1110, 1112 as discussed. System 1100 is therefore operable via valves 1122, 1124, and 1126 in the fashion as described in order to selectively operate expansion devices such as expansion device 1128 and expander 1118, depending on sub-critical, trans-critical, or super-critical operation. Overall capacity is controllable in the disclosed system using a varying compressor speed or by hot gas bypass (for instance with selective operation of valves 1122, 1124, and 1126). The disclosed system also allows for control of super, trans, and sub-critical operations, as well as control of head pressure, superheat, charge management, high and low pressure, and LP compressor motor temperature control, as examples.

System 1100 therefore includes compressors 1102, 1108, heat rejection exchangers 1104, 1106 operating as condensers or gas coolers, two circuits 1100 and 1112, evaporator 1130, a suction accumulator 1132, and corresponding connection lines that include a first circuit that includes expansion device 1128, and a second circuit that includes an expander 1118.

System 1100 includes suction accumulator 1132 and a receiver 1134 with solenoid or control valves 1136, 1138. Valve 1136 exposes receiver 1134 to a high pressure side thereof, and valve 1138 exposes receiver 1134 to a low pressure thereof. A system controller 1140 is coupled to at least four sensors: a low side pressure sensor 1142, a high pressure sensor 1144, a temperature sensor 1146 at an inlet to expansion device 1128, and a temperature sensor 1148 at evaporator 1130. Safety switches 1150, a head pressure control valve 1152, and a hot gas bypass valve 1154 may operate with and are coupled to 1156 controller 1140. Optimal pressure in the gas cooler varies with heat sink temperature. The pressure depends on an amount of refrigerant circulation in the system. Receiver 1134 serves to accumulate reserve refrigerant to provide flexibility in system operation as the system operates in sub-critical, trans-critical, and super-critical steady-state modes, as will be further described. Amongst its functions, receiver 1134 accumulates reserve refrigerant, and permits pumping down the system.

And, as stated, system 1100 may be operated with three main modes of operation. Sub-critical operation takes place when the sink generates high-side pressure that is below the critical pressure. Super-critical operation takes place when the heat sink and loads on the evaporator generate a low side pressure that is above the critical pressure. Trans-critical operation occurs when the heat sink and loads on the evaporator create a high side pressure that is above, and a low side pressure that is below, the critical pressure.

In a first mode of trans-critical operation, valves 1122 and 1124 are open, and valve 1126 is closed. In such an operation, both compressors 1102, 1108, and expander 1118 are on. Heat rejection is to heat exchanger 1104, thereby operating as a gas cooler. In this operation, superheat is not controlled, and suction accumulator 1132 is engaged to substitute the superheat control and provide charge management. Receiver 1134 is open to the suction side (that is, valve 1138 is open).

In a second mode of trans-critical operation, valves 1122 and 1126 are open and valve 1124 is closed. In this mode, both compressors 1102, 1108 and expander 1118 are on.

In a third mode of trans-critical operation, used in one example for system startup, valves 1122, 1124, and 1126 are open, and both compressors 1102, 1108 and expander 1118 are on.

In a fourth mode of trans-critical operation, valve 1122 is open, and valves 1124 and 1126 are closed, both compressors 1102, 1108 are on, and expander 1118 is off. This mode may imply that the expander 1118, the compressor stages 1102 and 1108, and motor 1114 are on the same shaft, and the expander 1118 is decoupled from rotation. This mode may be operated in sub-critical operation as well.

In a sub-critical mode of operation, valve 1122 is open and valves 1124 and 1126 are closed. In this mode, HP compressor 1108 is off, LP compressor 1102 is on, and heat rejection is to heat exchanger 1104 thereby operating as a condenser. This mode of operation is available for superheat control/operation as well. And, in this mode, the refrigerant volume is appropriately sized, the suction accumulator 1132 is empty, and the receiver 1134 is open to the suction side (e.g., valve 1138 is open).

In a super-critical mode of operation, valve 1126 is open, and valves 1122 and 1124 are closed. Both compressors 1102, 1118 and expander 1118 are on. Heat rejection is to heat exchanger 1104, operating as a gas cooler. The evaporator 1130, in this mode, operates as a single phase heat exchanger, superheat is not controlled, and suction accumulator 1132 is empty. The receiver, in this mode, takes in a portion of the circulating charge (e.g., valve 1136 is open), and valve 1138 is closed. A portion of the refrigerant charge in the receiver 1134 is released when operation is reversed.

System 1100 may be switched between modes of operation, according to the disclosure. When operating in sub-critical mode, pressure monitored on the high pressure side is below the critical pressure. When operating in super-critical mode, pressure monitored in the low pressure side is above the critical pressure. And, trans-critical mode occurs when the pressure in the high pressure side is above critical pressure and the pressure in the low pressure side is below the critical pressure. Switching between the trans-critical modes is based on enthalpy calculated at the high side pressure, the temperature at inlet to the expansion valve, and the vapor states at the low side pressure. As such, when the enthalpy is approximate to or above a saturated vapor enthalpy, then mode 1 is employed. In other cases, trans-critical modes are applicable and a differentiator for mode selection may be based on such selection criteria such as system efficiency, or original or operational system costs.

Various controls may be used in each operational mode. For instance, all disclosed modes may use: variable speed capacity control for LP compressor 1102; hot gas bypass control; low and high pressure switches 1150, and LP compressor motor temperature switch 1114. In sub-critical operation, superheat control and head pressure control is employed. In trans-critical mode a charge measurement control may be used in the suction accumulator 1132. In super-critical mode, charge management control may be employed using receiver 1134.

Capacity may be controlled by sensing a temperature of the fluid leaving the evaporator 1130 and by varying the speed of LP compressor 1102. The compressor speed may be changed within a certain range. To cope with further reduction of the load, a hot gas bypass is engaged. If load on the evaporator 1130 reduces to such an extent that the evaporating/suction pressure reduces to its set point, the hot gas bypass control valve 1154 opens its orifice, expands the hot compressed vapor at a constant enthalpy to a pressure in evaporator 1130, and fills evaporator 1130 with the hot gas bypassing the condenser 1104 and the expansion device 1128. The hot gas replaces the cold liquid and balances the load. In embodiments, the hot gas bypass control valve 1154 is a mechanical device, and in another embodiment an electronic device with a stepper motor and its own controller (not shown).

Superheat is controlled using thermostatic expansion valves that regulate flow into evaporator 1130 by maintaining a nearly constant superheat at the evaporator outlet, optimizing performance of the evaporator 1130. As superheat (at the evaporator outlet) rises due to an increased heat load on the evaporator 1130, the expansion valve 1128 increases refrigerant flow until superheat returns the valve setting. Conversely, the expansion valve 1128 may decrease refrigerant flow when superheat lowers as a result of a decreased heat load on the evaporator 1130. In embodiments, the expansion valve 1128 is a mechanical device, and in another embodiment an electronic device with a stepper motor and its own controller (not shown).

In one example, superheat is not controlled in trans-critical operation mode and charge management is executed by the suction accumulator 1132 (substituting the superheat control). When load on the evaporator 1130 reduces, the suction accumulator 1132 captures and stores non-evaporated liquid and thus circulated charge is adjusted to match the capacity demand. When the load recovers, the stored liquid boils in the suction accumulator 1132 and is induced into circulation. Super-critical operation implies a single-phase Brayton cycle and its performance is sensible to the circulating charge; a proper circulating charge can be provided if a proper actuation of valves SV4 and SV5 maintains a set suction side pressure.

When the heat sink temperature is below a set point head pressure, control valves restrict the liquid flow from the condenser 1106 to a recuperative heat exchanger 1158. This backs liquid refrigerant into the condenser 1106, reducing its capacity which in turn increases the condensing pressure; at the same time the hot gas raises liquid pressure in the recuperative heat exchanger 1158, allowing the expansion valve 1128 to operate normally. The head pressure control valve 1152 can be a mechanical device or an electronic device with a stepper motor and its own controller (not shown). In sub-critical mode, when the heat sink drives head pressure below a set point, a head pressure control valve restricts from the heat rejection exchanger 1106 operating as a condenser to the recuperative heat exchanger 1158.

A high pressure switch 1160 on the HP discharge side prevents the compressor 1108 from operation at an excessively high discharge pressure; and an additional or optional high temperature switch may be used. A high pressure switch 1162 on the LP discharge side (not mandatory) prevents the compressor 1102 from operation at an excessively high discharge pressure; an additional or optional high temperature switch may be used. A low pressure switch 1164 on the LP suction side prevents the compressor 1102 from operation at an excessively low suction pressure; an optional low temperature switch may be used. A temperature switch prevents LP compressor motor from operation at excessively high temperature. All switches shut the system down and resume its operation after a delay as long as a diagnostic system detects and allows such operation.

During system startup, valves 1122, 1124, 1126, and 1138 are open, and valve 1136 is closed. In such fashion, liquid refrigerant in receiver 1134 is available and pulled via the LP compressor 1102 using variable speed operation. The system begins in trans-critical mode, described above. The controller 1140 and pressure sensors 1142, 1144 identify and classify the operational mode and appropriate controls are engaged.

In general, computing systems 226 and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX® operating system distributed by International Business Machines of Armonk, N.Y., the Linux® operating system, the Mac® OS X and iOS operating systems distributed by Apple Inc. of Cupertino, Calif., and the Android® operating system developed by the Open Handset Alliance.

Computing devices 226 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C®, C++®, Visual Basic®, Java Script®, Perl®, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A cooling system comprising:
    a first heat exchanger positioned in an aircraft and configured to reject heat to air at ambient conditions of the aircraft;
    an expansion device;
    an expansion machine;
    an evaporator coupled to a thermal load of the aircraft;
    first and second cooling circuits both coupled to the first heat exchanger such that the first heat exchanger rejects heat to the air from both the first and second cooling circuits, the first and second cooling circuits selectable via a set of at least three cooling circuit valves that are arranged to direct a refrigerant through the first cooling circuit, the second cooling circuit, or both the first and second cooling circuits based on air passing through the first heat exchanger, wherein one of the at least three cooling circuit valves is operable to bypass refrigerant to a second compressor before reaching the evaporator; and a receiver coupled in parallel with both the first and second cooling circuits, the receiver configured to receive the refrigerant from the first and second cooling circuits and to accumulate reserve refrigerant to provide flexibility in system operation as the cooling system operates in sub-critical, trans-critical, and super-critical modes of operation;

wherein:
the first cooling circuit includes the expansion device;
the second cooling circuit includes a first compressor and the expansion machine;
the first cooling circuit passes from the first heat exchanger to the evaporator; and
the second cooling circuit passes from the first heat exchanger to the evaporator and in parallel to the first cooling circuit.

2. The cooling system as claimed in claim 1, wherein the cooling system is for the aircraft, and the ambient conditions are defined by an operating condition of the aircraft.

3. The cooling system as claimed in claim 1, further comprising the first compressor configured to compress the refrigerant to a first pressure;
wherein the expansion machine is a turbine that is rotationally coupled to the first compressor through a shaft, and the expansion device is an expansion valve.

4. The cooling system as claimed in claim 3, further comprising:
the second compressor configured to, prior to entering the first compressor, compress the refrigerant to a second pressure that is less than the first pressure; and
a second heat exchanger configured to cool the refrigerant prior to entering the first compressor but after exiting the second compressor.

5. The cooling system as claimed in claim 1, further comprising:
first and second receiver valves on respective low and high pressure sides of the receiver; and
a controller configured to operate the cooling circuit valves and the receiver valves based on the ambient conditions of the aircraft.

6. The cooling system as claimed in claim 5, further comprising a high pressure sensor positioned on a high pressure side of the first and second cooling circuits, and a low pressure sensor on a low pressure side of the first and second cooling circuits, wherein the controller is configured to control the mode of operation based at least on one of a measurement of the low pressure sensor and the high pressure sensor.

7. The cooling system as claimed in claim 1, wherein the refrigerant is $CO_2$.

8. The cooling system as claimed in claim 1, further comprising a recuperative heat exchanger coupled to the first cooling circuit, and coupled to the one cooling circuit valve that bypasses the coolant to the second compressor.

9. A method of operating a cooling system, the method comprising:
operating a set of three valves that cause a refrigerant to pass through a heat exchanger and direct the refrigerant through a first cooling circuit to include an expansion device, a second cooling circuit to include an expansion machine coupled to a first compressor, or both depending on ambient conditions, wherein one of the three valves is operable to bypass refrigerant before reaching an evaporator to a second compressor;
accumulating reserve refrigerant in a receiver to provide flexibility in system operation as the cooling system operates in sub-critical, trans-critical, and super-critical modes of operation, the receiver coupled in parallel with both the first and second cooling circuits; and
receiving the refrigerant from both the first and second cooling circuits in the receiver;
wherein:
the first cooling circuit passes from the first heat exchanger to the evaporator; and
the second cooling circuit passes from the first heat exchanger to the evaporator and in parallel to the first cooling circuit.

10. The method of claim 9, further comprising compressing the refrigerant in the first compressor to a first pressure; wherein the expansion machine is a turbine that is rotationally coupled to the first compressor through a shaft, and the expansion device is an expansion valve.

11. The method of claim 10, further comprising:
compressing the refrigerant to a second pressure that is less than the first pressure in the second compressor that is configured to pass the refrigerant to the first compressor; and
cooling the refrigerant in a second heat exchanger and prior to entering the first compressor but after exiting the second compressor.

12. The method of claim 9, further comprising:
operating cooling circuit valves and receiver valves based on the ambient conditions of an aircraft, wherein the receiver valves comprise first and second receiver valves on respective low and high pressure sides of the receiver; and
operating the cooling circuit valves and the receiver valves based on the ambient conditions of the aircraft.

13. The method of claim 9, further comprising controlling the mode of operation based at least on one of a measurement of a low pressure sensor and a high pressure sensor, wherein the high pressure sensor is positioned on a high pressure side of the first and second cooling circuits, and the low pressure sensor is positioned on a low pressure side of the first and second cooling circuits.

14. The method of claim 9, wherein the refrigerant is $CO_2$.

15. The method of claim 9, further comprising passing the refrigerant to a recuperative heat exchanger that is coupled to the first cooling circuit, wherein the one valve is configured to bypass the coolant through the recuperative heat exchanger to the second compressor.

16. An aircraft comprising:
a first heat exchanger;
an expansion device;
an expansion machine;
an evaporator coupled to a thermal load of the aircraft;
first and second cooling circuits coupled to the heat exchanger via at least three cooling circuit valves, the first and second cooling circuits selectable to direct a refrigerant through the first circuit to include the expansion device, the second circuit to include the expansion machine coupled to a first compressor, or both the first and second circuits based on air passing through the first heat exchanger at ambient conditions of the aircraft, wherein one of the at least three cooling circuit valves is operable to bypass refrigerant to a second compressor before reaching the evaporator; and a receiver coupled in parallel with both the first and second cooling circuits, the receiver configured to receive the refrigerant from the first and second cooling circuits and to accumulate reserve refrigerant to provide flexibility in system operation as the cooling system operates in sub-critical, trans-critical, and super-critical modes of operation;

wherein:

the first cooling circuit passes from the first heat exchanger to the evaporator; and the second cooling circuit passes from the first heat exchanger to the evaporator and in parallel to the first cooling circuit.

17. The aircraft as claimed in claim 16, wherein the first cooling circuit includes the expansion device, and the second cooling circuit includes the expansion machine coupled to the first compressor, the cooling system further comprising the first compressor configured to compress the refrigerant to a first pressure, wherein the expansion machine is a turbine that is rotationally coupled to the first compressor through a shaft, and the expansion device is an expansion valve.

18. The aircraft as claimed in claim 17, the cooling circuit further comprising:

the second compressor configured to, prior to entering the first compressor, compress the refrigerant to a second pressure that is less than the first pressure; and a second heat exchanger configured to cool the refrigerant prior to entering the first compressor but after exiting the second compressor.

19. The aircraft as claimed in claim 16, the cooling circuit further comprising:

first and second receiver valves on respective low and high pressure sides of the receiver;

a controller configured to cooling circuit valves and the receiver valves based on the ambient conditions of the aircraft; and a high pressure sensor positioned on a high pressure side of the first and second cooling circuits, and a low pressure sensor on a low pressure side of the first and second cooling circuits, wherein the controller is configured to control the mode of operation based at least on one of a measurement of the low pressure sensor and the high pressure sensor.

20. The aircraft as claimed in claim 16, wherein the refrigerant is $CO_2$.

\* \* \* \* \*